F. A. MOORE.
BARREL LIFTING TRUCK.
APPLICATION FILED OCT. 17, 1910.
986,585.
Patented Mar. 14, 1911.
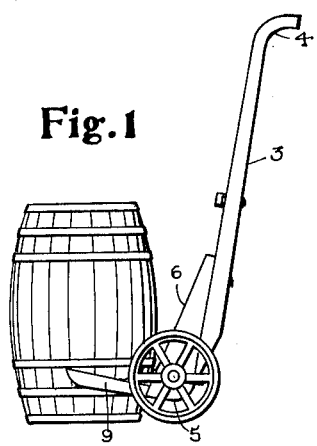
Fig. 1
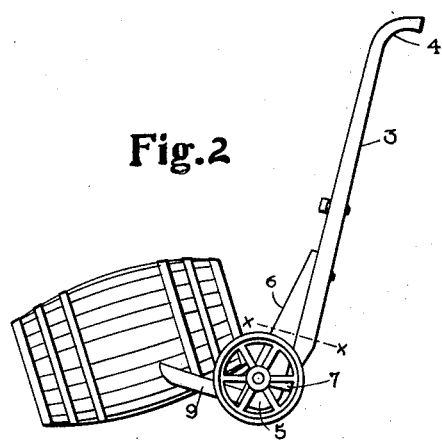
Fig. 2
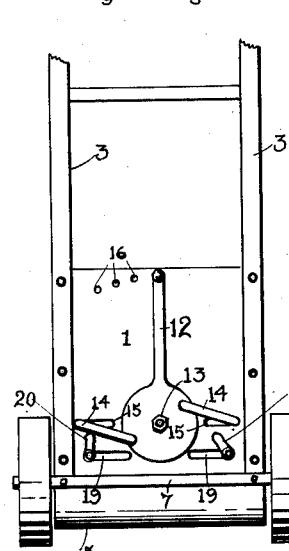
Fig. 3
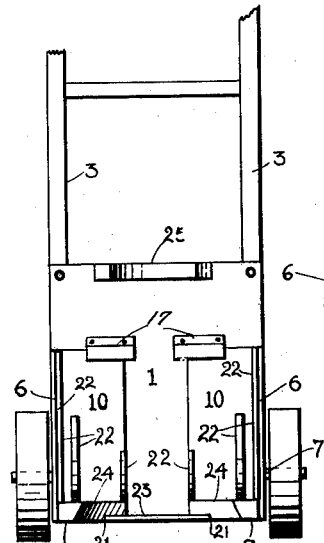
Fig. 4
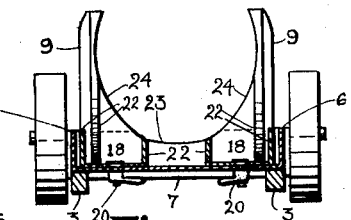
Fig. 5
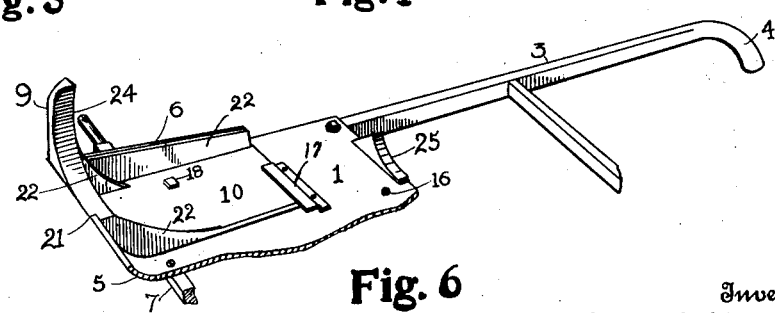
Fig. 6
Witnesses
A. Frank Draper.
Chas. W. Stauffiger.
Inventor
FRANK A. MOORE
By 
Attorneys

UNITED STATES PATENT OFFICE.

FRANK A. MOORE, OF WYANDOTTE, MICHIGAN.

BARREL-LIFTING TRUCK.

986,585.  Specification of Letters Patent.  Patented Mar. 14, 1911.

Application filed October 17, 1910. Serial No. 587,588.

*To all whom it may concern:*

Be it known that I, FRANK A. MOORE, a citizen of the United States of America, residing at Wyandotte, in the county of Wayne and State of Michigan, have invented certain new and useful Improvements in Barrel-Lifting Trucks, of which the following is a specification, reference being had therein to the accompanying drawings.

This invention relates to that kind of hand truck specifically adapted for use in warehouses, stores, on docks and the like for moving heavy merchandise contained in barrels.

The main object of the invention is to provide a truck of this character which enables the operator to pick up a barrel and transfer it to the truck whether it is standing on its head or lying on its side and to accomplish this object without the operator ever being obliged to take his hands off the truck, thus giving him at all times command of his full strength.

To this end the invention consists in the specific construction, arrangement and operation of the gripping jaws for the barrel all as more fully hereinafter described and shown in the accompanying drawings, in which—

Figure 1 is a side elevation showing the truck in position for loading a barrel standing on its head; Fig. 2 is a like side elevation showing the truck in position to upend a barrel; Fig. 3 is a rear elevation of the truck in its upright position; Fig. 4 is a front elevation thereof in upright position; Fig. 5 is a cross section thereof substantially on line x—x Fig. 2 and looking toward the jaws of the truck, and Fig. 6 is a fragmentary perspective view of the truck.

Referring to the drawings, the frame of the truck consists of a single bed plate 1 which integrally forms the entire platform thereof and of the parallel side bars 3 secured to the edges of the bed plate and terminating in handles 4.

The bed plate forms on its forward end an upturned toe 5 which is on the arc of a circle having its center in the axis of the wheels and side flanges 6 unite the toe at the ends with the bed plate. The platform is directly supported near its forward end upon wheels the axles of which may be either formed integral with the side flanges of the bed plate or a separate cranked axle 7 may be secured to the underside thereof with the wheels in such position to the bed plate that the toe thereof is in close proximity to the ground when the truck is in the position shown in Figs. 1 and 2. Upon this bed plate are supported a pair of massive jaws 9 which extend outwardly at right angles thereto and are detachably and adjustably secured thereto by means of base plates 10, integrally formed with the jaws and conforming to the bed plate. As shown the adjustment is made by means of a lever 12 pivotally secured at 13 to the underside of the bed plate and connected by means of links 14 guided in transverse slots 15 to the base plates of the jaws, and adjusting holes 16 are provided in the bed plate and one in the end of the lever to secure the same in its adjusted position by a bolt.

The upper ends of the base plates are held in guides 17 and in addition bolts 18 passing through slots 19 in the bed plates and carrying handles nuts 20 secure the base plates firmly upon the bed plate. The jaws at their junction with the base plates are provided with shoulders 21 which bear against the edge of the toe and strengthening ribs 22 are provided in the angle between the jaws and their base plates, the ones at the outer edges conforming in size to the side flanges 6 of the bed plate.

The inner faces of the jaws are of segmental circular shape and in the normal adjustment for handling the standard size of barrels they are substantially on a common center and as a small part of the toe at 23 is cut away the parts conjointly form the larger part of a circle, the center of which is within the opening between the jaws and the diameter of which corresponds to that of the barrel at about the third hoop from the ends, while the distance between the points of the jaws, which is less than the length of the diameter, is sufficient to permit the entrance of the barrel at its head between the jaws. Another feature of these jaws is that the inner faces thereof are beveled throughout their whole extent in such manner that the upper edges 24 thereof form the gripping edges of the jaws and the above mentioned dimensions are given in reference thereto.

With a truck thus constructed the operator can easily push the truck under one end of a barrel lying on its side and engage the jaws therewith as shown in Fig. 2, and by pressing down on the handles the barrel is readily up ended. In the same way the truck is engaged with a barrel standing on its head as shown in Fig. 1 by pushing the truck against it with the jaws held about on a level. By a slight tipping of the truck the points of the jaws will then engage it at a point a little higher up but still beyond its center of gravity and the continued tipping of the truck will lift it up and transfer it to the truck.

To prevent the barrel from shifting or rolling a bearing 25 of circular shape is fastened upon the upper end of the bed plate.

Since the adjustment of the jaws is only required for adapting the truck to handle barrels of different sizes this feature of construction may be omitted if the truck is for handling barrels of uniform size and the jaws are then merely detachably secured to the bed plate.

In placing the jaws upon a bed plate which forms a combined platform and scoop, the spilling of material on the ground from handling broken or damaged barrels is avoided and besides the truck will be of service for many uses with the jaws entirely removed.

I claim as my invention:—

1. In a barrel truck, the combination with the wheeled truck frame having a platform provided with an upturned toe, the axis of the wheels being located above the platform, of a pair of jaws having segmental circular gripping faces and extending from the toe in a plane at right angles to the platform a distance exceeding the radius of the circle of the gripping faces.

2. In a barrel truck, the combination with the wheeled truck frame having a platform provided with an upturned toe concentric with the wheels—the axis of the wheels being located above the platform, of a pair of jaws secured upon the platform and extending from the toe in a plane at right angles to the platform a distance exceeding the radius of the gripping faces of the jaws, the gripping faces being of segmental circular shape and beveled from the upper to the lower faces of the jaws.

3. In a barrel truck, the combination with the wheeled truck frame having a platform terminating in an upturned toe concentric with the wheels—the axis of the wheels being located above the platform—of a pair of jaws having segmental circular gripping faces and extending from the toe in a plane at right angles to the platform a distance exceeding the radius of the circle of the gripping faces, each jaw provided with a base plate supporting the jaw upon the platform and with a shoulder supporting it upon the edge of the toe, and means laterally adjustably securing the jaws upon the platform.

4. In a barrel truck, the combination with the wheeled truck frame having a platform consisting of a bed plate integrally formed with sides and an upturned toe concentric with the wheels—the wheels being mounted on the sides with their axis above the bed plate, of a pair of jaws having segmental circular gripping faces and extending from the toe in a plane at right angles to the bed plate a distance exceeding the radius of the circle of the gripping faces, each jaw formed with a base plate adjustably secured upon the bed plate and with a shoulder supporting it upon the edge of the toe.

In testimony whereof I affix my signature in presence of two witnesses.

FRANK A. MOORE.

Witnesses:
 ANNA M. DORR,
 ANNA M. SHANNON.